Feb. 11, 1941.  G. R. R. FLANDES  2,231,183
SECTIONAL WHEEL FOR AUTOMOBILES
Filed May 25, 1939
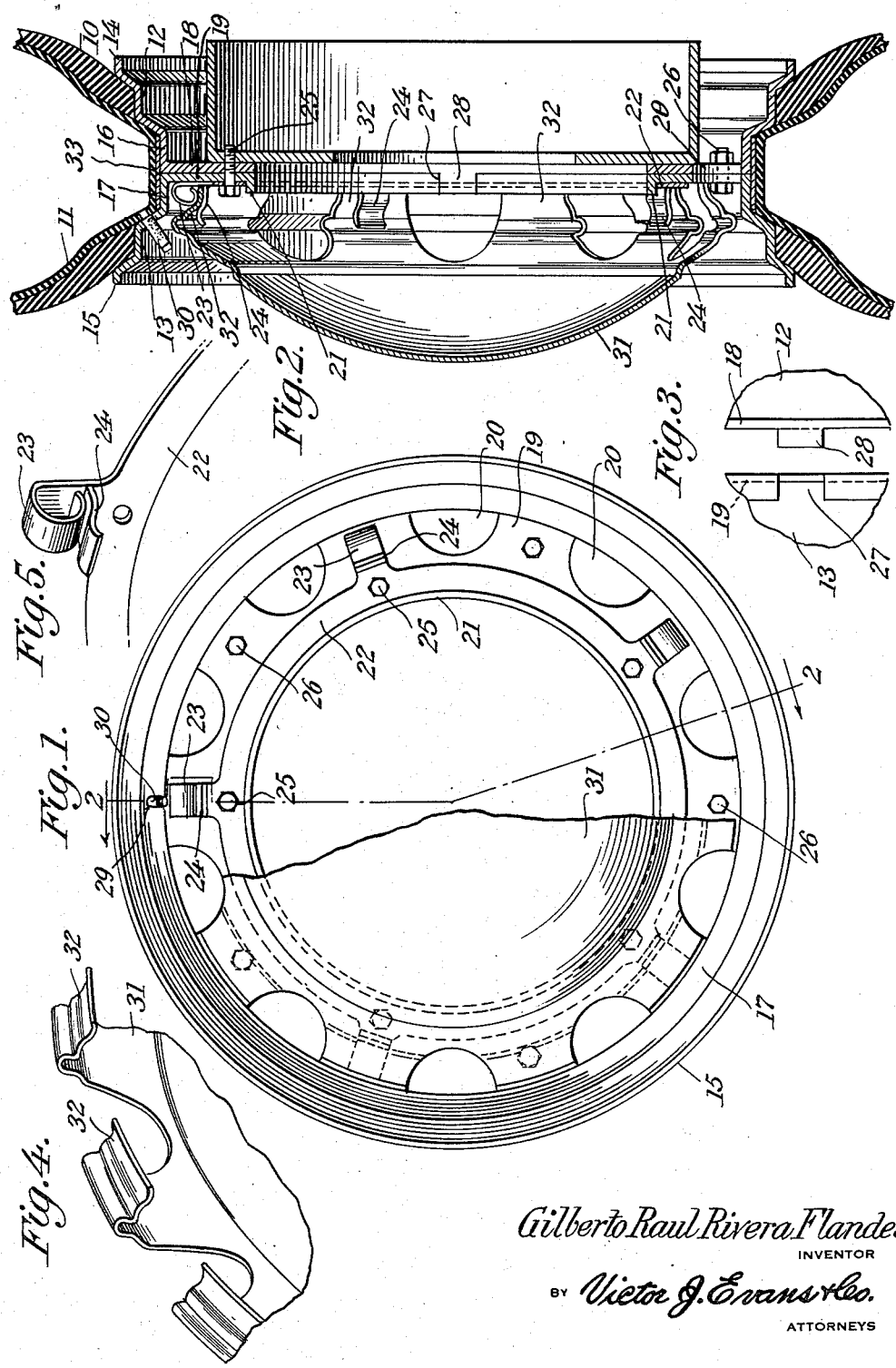
Gilberto Raul Rivera Flandes
INVENTOR
BY Victor J. Evans & Co.
ATTORNEYS Patented Feb. 11, 1941

2,231,183

UNITED STATES PATENT OFFICE 2,231,183

SECTIONAL WHEEL FOR AUTOMOBILES

Gilberto Raul Rivera Flandes, Mexico, D. F., Mexico

Application May 25, 1939, Serial No. 275,744
In Mexico March 13, 1939

1 Claim. (Cl. 301—63)

This invention relates to a sectional wheel for automobiles and has for an object to provide a wheel which may be easily disassembled to permit the pneumatic tire being freely removed as a unit without injury to the beads or without the necessity of detaching the pneumatic tire gradually from the rim as is now done.

A further object of the invention is to provide a sectional wheel which can be assembled or disassembled without use of special tools or special skill.

A further object is to provide a sectional wheel so constructed that the tire retaining flange portions of the rim may be considerably enlarged over conventional flange portions to promote safety in that the tire when punctured will remain in place on the rim and prevent serious accidents.

A further object is to provide a sectional wheel which will be formed of a few strong simple and durable parts which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a front elevation of a sectional wheel constructed in accordance with the invention, with portions broken away.

Figure 2 is a cross sectional view of the sectional wheel taken on the line 2—2 of Figure 1.

Figure 3 is a detail view showing one of the tongue and groove connections of the two sections of the wheel.

Figure 4 is a detail perspective view showing the resilient tongues on the hub cap.

Figure 5 is a detail perspective view showing the resilient hooks and spring tongues on the hub cap retaining ring.

Referring now to the drawing in which like characters of reference designate similar parts in the various views, 10 designates a pneumatic tire and 11 designates the inner tube thereof, these parts being conventional.

In carrying out the invention, a drop center rim tire wheel is provided, the same comprising a pair of rim sections 12 and 13 formed with respective tire retaining flange portions 14 and 15 of greater diameter than is conventional, and having respective flat drop center annular portions 16 and 17 which are formed integral with radially disposed flanges 18 and 19. The flanges have cut away portions 20 to make the construction lighter and these flanges form the spokes of the wheel. The flange 19 of the rim section 13 is provided with a shoulder 21 at its inner periphery which forms a seat for a hub cap retaining ring 22.

The hub cap retaining ring is provided with a plurality of resilient loops 23 and is also provided with a plurality of spring tongues 24 which are spaced from and confront the loops.

A plurality of screws 25 are passed through the flanges 18 and 19 of the rim sections, through the hub cap retaining ring 22 and are adapted to be passed into the brake drum to secure the parts of the wheel together as well as to secure the wheel to the brake drum. A plurality of bolts 26 or similar connectors are engaged through the flanges 18 and 19 of both rim sections 12 and 13 to coact with the screws 25 in securing the rim sections together.

As best shown in Figures 2 and 3, the shoulder 21 of the rim section 13 is provided with a plurality of recesses 27 which receive tongues 28 that project from the rim section 12. These interfitting tongue and recess connections between the rim sections assist in properly locating the sections relatively to each other when assembling the sections on a tire.

The rim section 13 is provided with an opening 29 to receive the valve 30 of the inner tube.

A hub cap 31 is provided with a plurality of resilient tongues 32, corresponding in number to the spring loops 23 and adapted to be received between the loops and the spring tongues 24.

A hoop 33, formed of aluminum or other desired material, is disposed to bridge the drop rim sections 16 and 17 and conceal the crevice between these sections so that the inner tube will not be pinched therebetween under severe conditions of service.

In operation to remove a tire, the vehicle wheel is jacked up as is conventional and then the hub cap 31 is removed. The brake drum bolts 25 are next removed so that the hub cap retaining ring 22 may be detached. Then the whole wheel is demounted and placed upon the ground with the rim section 12 uppermost. Then the bolts 26 or similar connectors are removed and this permits the removal of the section 12 from the section 13. The bridge hoop 33 is then removed whereupon the tire is free and can be removed as a unit without being removed gradually as is ordinarily done, and thus the beads are protected from injury.

From the above description it is thought that the construction and operation of the invention will be fully understood without further explanation.

What is claimed is:

A sectional wheel comprising a pair of rim sections formed with respective tire retaining flange portions and having respective drop center annular portions, radially disposed flanges formed integral with the drop center portions having cut-away portions to decrease the weight of the wheel and form spokes of the wheel, one of said flanges being provided with a shoulder at its inner periphery having a plurality of recesses, a plurality of tongues formed on the other rim section engaged in said recesses to assist in properly locating the sections relatively to each other when assembling the sections on a tire, a plurality of screws passed through the flanges and adapted to be engaged with a brake drum to secure the parts of the wheel together and to the brake drum, and a plurality of bolts engaged through the flanges between the screws and co-acting with the screws in securing the rim sections together.

GILBERTO RAUL RIVERA FLANDES.